United States Patent [19]

Hasegawa et al.

[11] 4,448,177

[45] May 15, 1984

[54] EXHAUST GAS RECIRCULATION CONTROL SYSTEM HAVING VARIABLE VALVE LIFT CORRECTING SPEED FOR EXHAUST GAS RECIRCULATION VALVE

[75] Inventors: Shumpei Hasegawa, Niiza; Takashi Koumura, Iruma; Toyohei Nakajima, Setagaya; Junichi Miyake, Iruma; Junichi Kimura, Higashimurayama, all of Japan

[73] Assignee: Honda Motor Co., Ltd., Tokyo, Japan

[21] Appl. No.: 437,894

[22] Filed: Nov. 1, 1982

[51] Int. Cl.³ .................................................. F02M 25/06
[52] U.S. Cl. .................................................. 123/571
[58] Field of Search .................. 123/571, 569, 568

[56] References Cited

U.S. PATENT DOCUMENTS

| | | | |
|---|---|---|---|
| 4,304,210 | 12/1981 | Hayakawa | 123/571 |
| 4,314,540 | 2/1982 | Ikeura | 123/571 |
| 4,318,385 | 3/1982 | Yamaguchi | 123/571 |
| 4,369,753 | 1/1983 | Sugiyama | 123/569 |
| 4,378,776 | 4/1983 | Nishimori | 123/571 |
| 4,378,777 | 4/1983 | Iida et al. | 123/571 |

*Primary Examiner*—Wendell E. Burns
*Attorney, Agent, or Firm*—Arthur L. Lessler

[57] ABSTRACT

An exhaust gas recirculation control system which is adapted to control the valve opening of the exhaust gas recirculation valve so as to minimize the difference between a detected value of the valve opening of the above value and a command value determined as a function of operating conditions of the engine. The valve opening is corrected at a higher speed when the above difference has a larger absolute value, and at a lower speed when the difference has a smaller absolute value, to ensure prompt and accurate control of the exhaust gas recirculation quantity.

11 Claims, 12 Drawing Figures

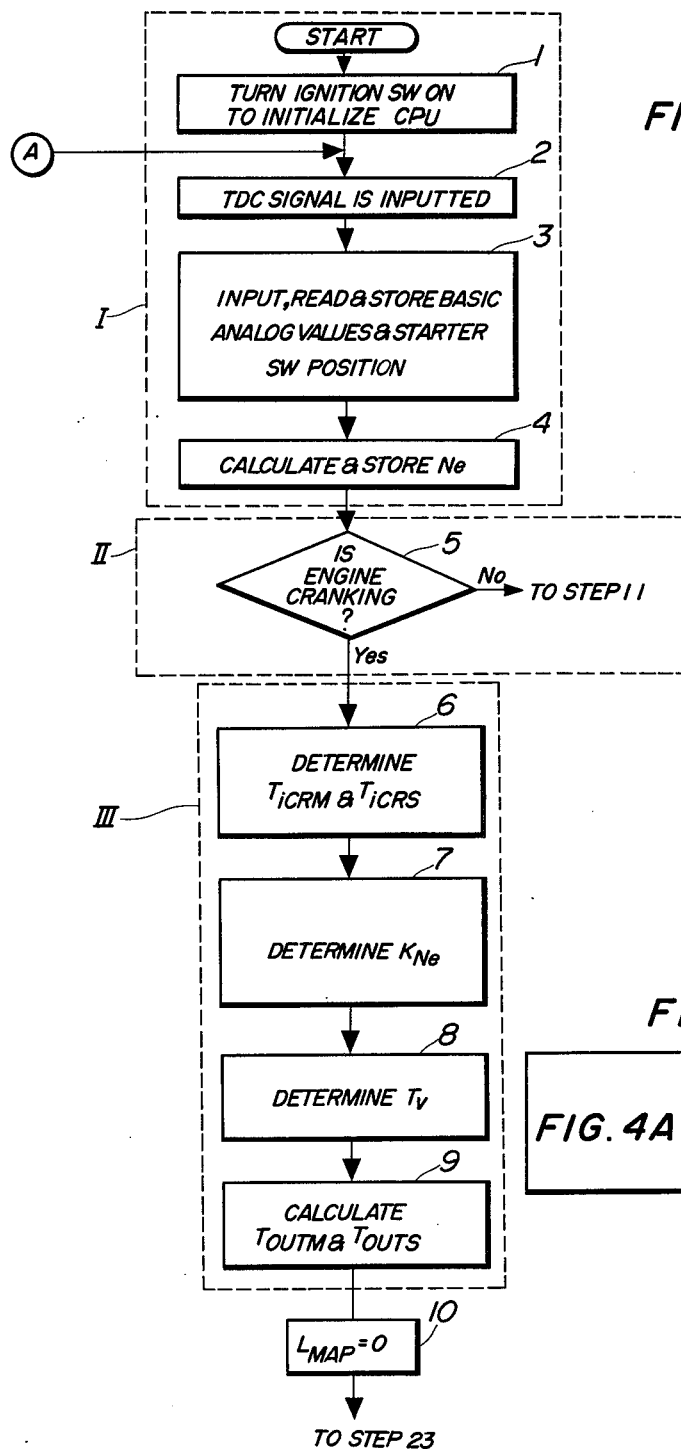

FIG.5

| Ne\PB | $P_{B6}$ | $P_{B7}$ | ----- | $P_{Bj}$ | ----- | $P_{B15}$ |
|---|---|---|---|---|---|---|
| $N_1$ | $L_{1.6}$ | $L_{1.7}$ | | | | |
| $N_2$ | $L_{2.6}$ | $L_{2.7}$ | | | | |
| ⋮ | | | | | | |
| $N_i$ | | | | $L_{ij}$ | | |
| ⋮ | | | | | | |
| $N_{10}$ | | | | | | $L_{10.15}$ |

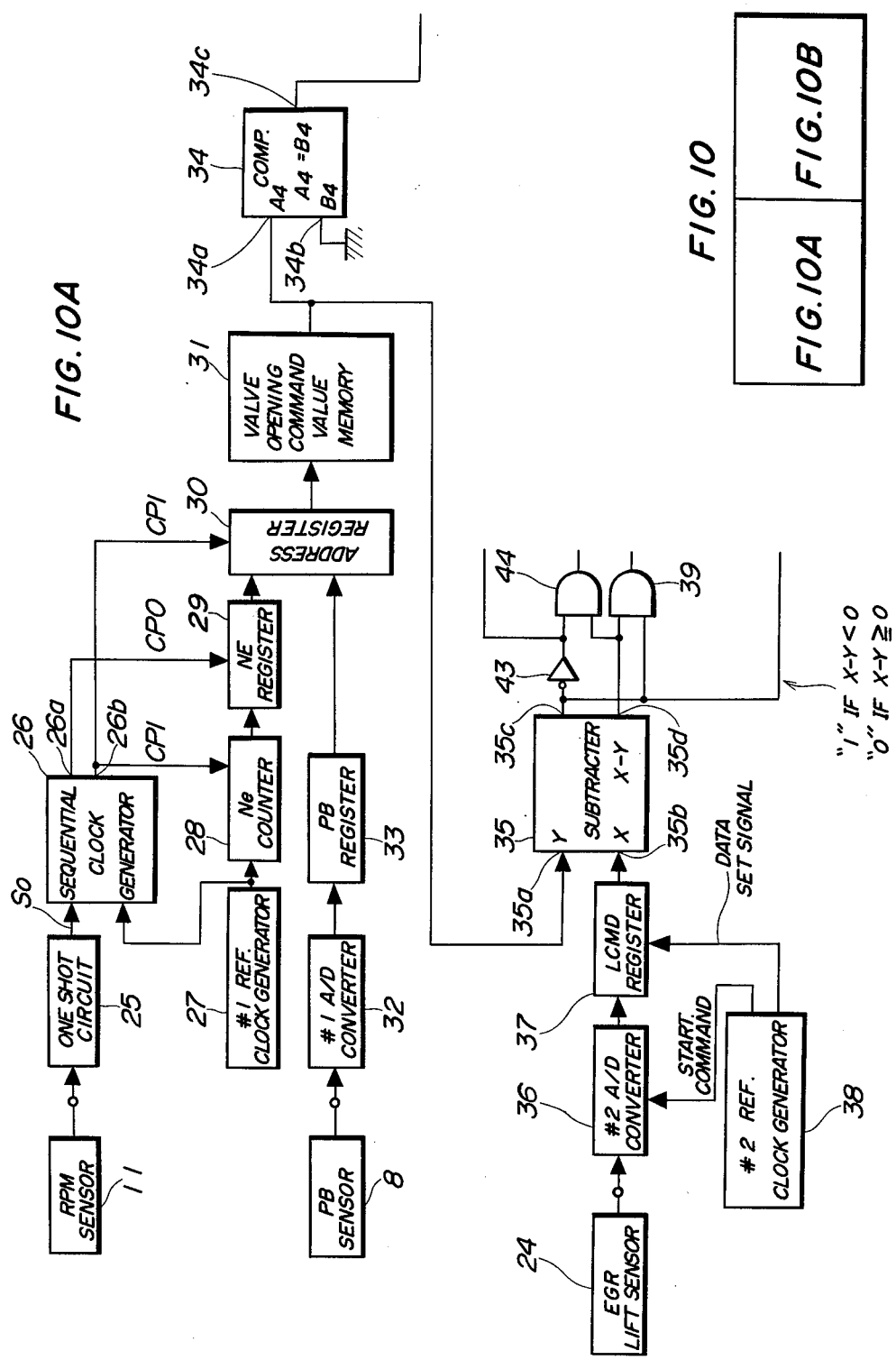

EXHAUST GAS RECIRCULATION CONTROL SYSTEM HAVING VARIABLE VALVE LIFT CORRECTING SPEED FOR EXHAUST GAS RECIRCULATION VALVE

BACKGROUND OF THE INVENTION

This invention relates to an exhaust gas recirculation control system for internal combustion engines, which is capable of effecting exhaust gas recirculation control in a prompt and accurate manner through feedback control of the valve opening of an exhaust gas recirculation valve.

A fuel supply control system adapted for use with an internal combustion engine, particularly a gasoline engine has been proposed e.g. by U.S. Ser. No. 8,205,940 assigned to the same assignee as the present application, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

According to the above proposed fuel supply control system, the basic value of the valve opening period of the fuel injection device is determined by the use of two different engine rpm-intake pipe absolute pressure maps which are selectively used depending upon whether the exhaust gas recirculation valve is operating or at rest. On the other hand, the exhaust gas recirculation valve has its valve lifting amount determined as a function of engine rpm, intake pipe absolute pressure, etc. for control of the exhaust gas recirculation quantity. In these manners, the exhaust gas recirculation quantity and the fuel supply quantity are controlled in dependence on operating conditions of the engine, so as to achieve optimum emission characteristics and driveability of the engine.

On the other hand, an exhaust gas recirculation control system has been proposed e.g. by U.S. Pat. No. 4,164,032, in which valve opening or lift command values for the exhaust gas recirculation valve are previously determined as required values, which are functions of operating conditions of the engine, the actual valve opening or lift value is detected, and the valve opening or lift value of the exhaust gas recirculation valve is controlled in a feedback manner so as to minimize the difference between a valve opening or lift command value and an actual detected value. In such proposed system, the exhaust gas recirculation valve is generally adapted to be closed or opened by an actuator which is responsive to the difference between negative pressure in the intake pipe and atmospheric pressure. Therefore, if the valve opening correcting speed of the actuator is not appropriate, the valve opening of the exhaust gas recirculation valve cannot be exactly controlled to a required value. For instance, if the correcting speed is too high, the actuator and the exhaust gas recirculation valve coupled thereto undergo overshooting or hunting, while if the correcting speed is too low, sufficiently high control responsiveness cannot be obtained. Thus, accurate control of the exhaust gas recirculation quantity is not feasible with inappropriate valve opening correcting speeds.

OBJECT AND SUMMARY OF THE INVENTION

It is the object of the invention to provide an exhaust gas recirculation control system for use with an internal combustion engine, which is adapted to effect feedback control of the valve opening of the exhaust gas recirculation valve with a plurality of different valve opening correcting speeds selectively used in dependence on the absolute value of the difference between a required valve opening value and an actual valve opening value of the exhaust gas recirculation valve.

The present invention provides an exhaust gas recirculation control system for use in an internal combustion engine having an intake pipe and an exhaust pipe. The control system comprises: an exhaust gas recirculating passageway connecting the exhaust pipe to the intake pipe; an exhaust gas recirculation valve having a controllable valve opening and arranged across the exhaust gas recirculating passageway for opening and closing same; command means responsive to operating conditions of the engine for generating a command signal indicative of a required valve opening value of the exhaust gas recirculation valve; sensor means for detecting an actual value of the valve opening of the exhaust gas recirculation valve and generating a signal indicative of the actual value; actuator means connected to the exhaust gas recirculation valve for varying its valve opening; and control means responsive to the difference between an actual valve opening value indicated by the above actual value signal and a required valve opening value indicated by the above command signal for controlling the actuator means so as to minimize the above difference. The control means is operable to control the actuator means to vary the valve opening of the exhaust gas recirculation valve at a plurality of different speeds in such a manner that a higher speed is selected when the above difference has a larger value, and a lower speed is selected when the difference has a smaller value.

The above and other objects, features and advantages of the invention will be more apparent from the ensuing detailed description taken in connection with the accompanying drawings.

BRIEF DESCRIPTION OF THE DRAWINGS

FIG. 4, 4A, and 4B are a flow chart showing a main program for control of the fuel supply inclusive of the exhaust gas recirculation control;

FIG. 5 is a view showing a map of valve lift command values LMAP for the exhaust gas recirculation valve in FIG. 1;

FIGS. 10A and 10B are a circuit diagram illustrating an electrical circuit forming essential part of the exhaust gas recirculation control system according to one embodiment of the present invention.

DETAILED DESCRIPTION

The present invention will now be described in detail with reference to the drawings.

Figure 1:
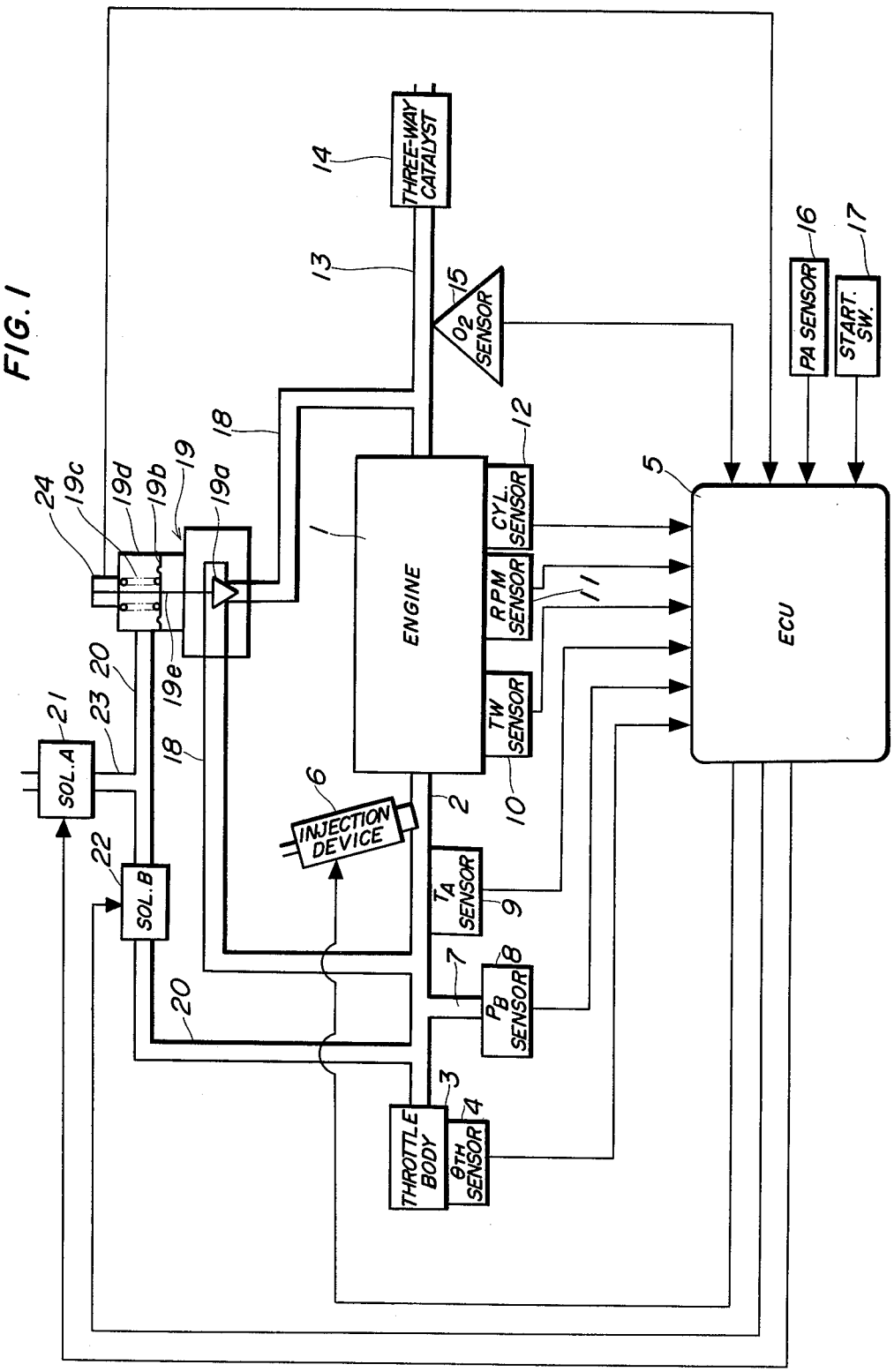
FIG. 1 is a block diagram illustrating a fuel supply control system for internal combustion engines, to which is applicable the exhaust gas recirculation control system according to the present invention.

Referring first to FIG. 1, there is illustrated the whole arrangement of a fuel injection control system for internal combustion engines, to which the present invention is applicable. Reference numeral 1 designates an internal combustion engine which may be a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 is a throttle body 3 which accommodates a main throttle valve and a sub throttle valve mounted in the main intake pipe and the sub intake pipe, respectively, for synchronous operation. Neither of the two throttling valves is shown. A throttle valve opening sensor 4 is connected to the main throttle valve for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors and a subinjector, all formed by electromagnetically operated fuel injection valves, none of which is shown. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The fuel injection device 6 is connected to a fuel pump, not shown. The main injectors and the subinjector are electrically connected to the ECU 5 in a manner having their valve opening periods or fuel injection quantities controlled by driving signals supplied from the ECU 5.

On the other hand, an absolute pressure sensor 8 communicates through a conduit 7 with the interior of the main intake pipe at a location immediately downstream of the main throttle valve of the throttle body 3. The absolute pressure sensor 8 is adapted to detect absolute pressure in the intake pipe 2 and applied an electrical signal indicative of detected absolute pressure to the ECU 5. An intake-air temperature sensor 9 is arranged in the intake pipe 2 at a location downstream of the absolute pressure sensor 8 and also electrically connected to the ECU 5 of supplying thereto an electrical signal indicative of detected intake-air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., a pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure and a starting switch 17 of the engine, respectively, for supplying an electrical signal indicative of detected atmospheric pressure and an electrical signal indicative of its own on and off positions to the ECU 5.

An exhaust gas recirculating passageway 18 is provided which connects the exhaust pipe 13 to the intake pipe 2, and across which is mounted an exhaust gas recirculation valve 19. This valve 19 is a negative pressure-actuated type and comprises a valve body 19a arranged for opening and closing the passageway 18, a diaphragm 19b coupled to the valve body 19a by means of a valve rod 19e and actuatable by atmospheric pressure or negative pressure which is selectively applied thereto by means of EGR control valves 21 and 22, hereinafter referred to, and a spring 19c urging the diaphragm 19b in the valve closing direction. A negative pressure chamber 19d is defined by the diaphragm 19b, which is connected to a communication passageway 20 for introducing absolute pressure in the intake pipe 2 by way of the EGR control valve 22 which is a normally closed type and arranged across the communication passageway 20. An atmospheric pressure-intake passageway 23 is joined to the communication passageway 20 at a location downstream of the EGR control valve 22 so that atmospheric pressure is introduced into the communication passageway 20 by way of the EGR control valve 21 which is a normally open type and which is arranged across the communication passageway 23, and then guided into the negative pressure chamber 19d. The EGR control valves 21 and 22 are both electrically connected to the ECU 5 for operation in unison with each other or alone in response to control signals from the ECU 5 to control the lifting motion of the valve body 19a of the exhaust gas recirculation valve 19 and the moving speed thereof.

A lift sensor 24, which may be formed of a potentiometer, is mounted on the exhaust gas recirculation valve 19 for detecting the operating position of the valve body 19a of the valve 19 and supplying an electrical signal indicative of its detected operating position of the valve body to the ECU 5.

Next, the fuel quantity control action of the fuel supply control system arranged as above will now be described in detail with reference to FIG. 1 referred to hereinabove and FIGS. 2 through 4.

Figure 2:
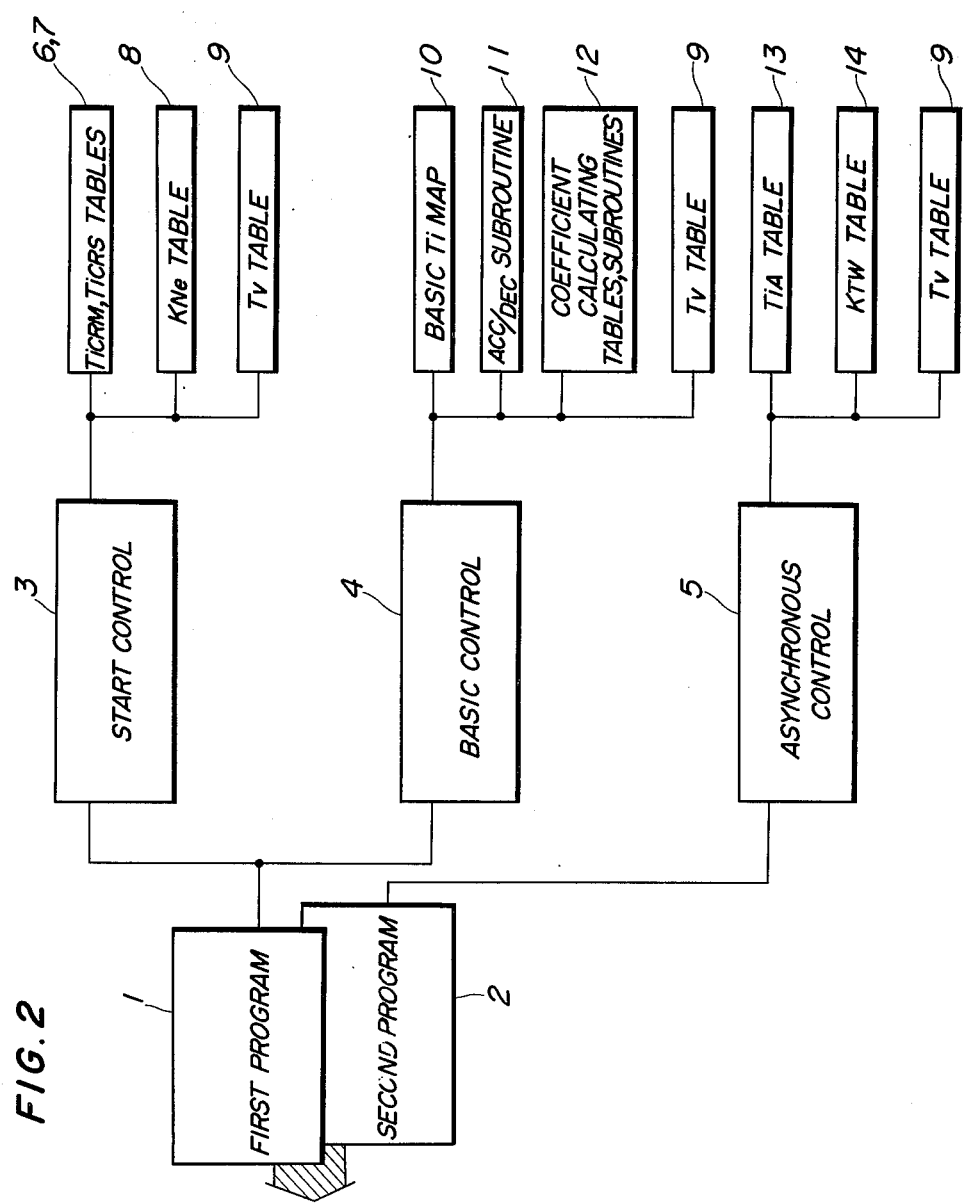
FIG. 2 is a block diagram illustrating a program for control of the valve opening periods TOUTM and TOUTS of the main injectors and the subinjector, which is operated by an electronic control unit (ECU) in FIG. 1.

FIG. 2 shows a block diagram showing the whole program for air/fuel ratio control, i.e., control of the valve periods TOUTM and TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises as asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (1)$$

$$TOUTS = TiCRS \times KNe + TV \quad (2)$$

where TiCRM and TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery, which is determined from a TV table 9. $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times KAFC \times KPA \times KAST \times KWOT \times KO_2 \times KLS) + TACC \times (KTA \times KTWT \times KAFC \times KPA \times KAST) + (TV + \Delta TV) \quad (3)$$

$$TOUTS = (TiS - TDEC) \times (KTA \times KTW \times KAST \times KPA) + TV \quad (4)$$

where TiM and TiS represent basic values of the valve opening periods for the main injectors and subinjector, respectively, and are determined from a basic Ti map 10, and TDEC and TACC represent constants applicable, respectively, at engine decceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, $KO_2$ an "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture.

On the other hand, the valve opening period TMA for the main injectors which is applicable in asynchronism with TDC signal is determined by the following equation:

$$TMA = TiA \times KTWT \times KAST + (TV + \Delta TV) \quad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 3:
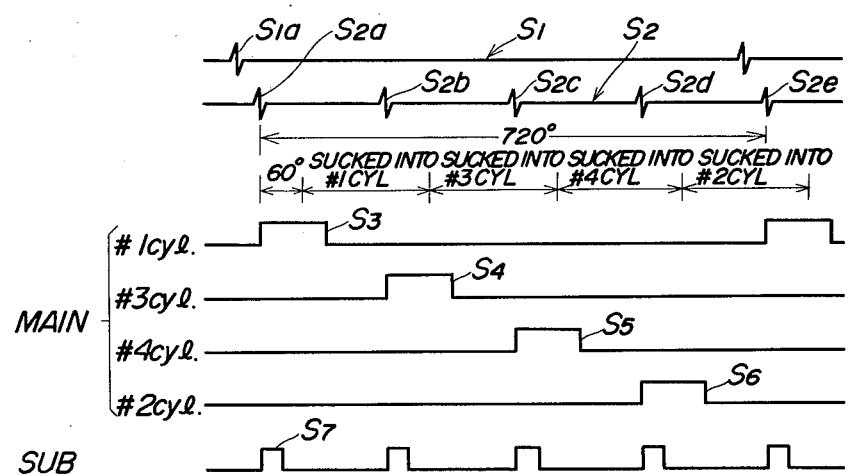
FIG. 3 is a timing chart showing the relationship between a cylinder-discriminating signal and a TDC signal inputted to the ECU, and drive signals for the main injectors and the subinjector, outputted from the ECU.

FIG. 3 is a timing chart showing the relationship between the cylinder-discriminating signal and the TDC signal, both inputted to the ECU 5, and the driving signals outputted from the ECU 5 for driving the main injectors and the subinjector. The cylinder-discriminating signal $S_1$ is inputted to the ECU 5 in the form of a pulse $S_1$ a each time the engine crankshaft rotates through 720 degrees. Pulses $S_{2a}$–$S_{2e}$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_{2a}$, the driving signal $S_4$ for the third engine cylinder concurrently with the second TDC signal pulse $S_{2b}$, the driving signal $S_5$ for the fourth cylinder concurrently with the third pulse $S_{2c}$, and the driving signal $S_6$ for the second cylinder concurrently with the fourth pulse $S_{2d}$, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_{2a}$, $S_{2b}$, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake pipe before the piston reaches its top dead center and the operation of the associated injector.

Figure 4B:
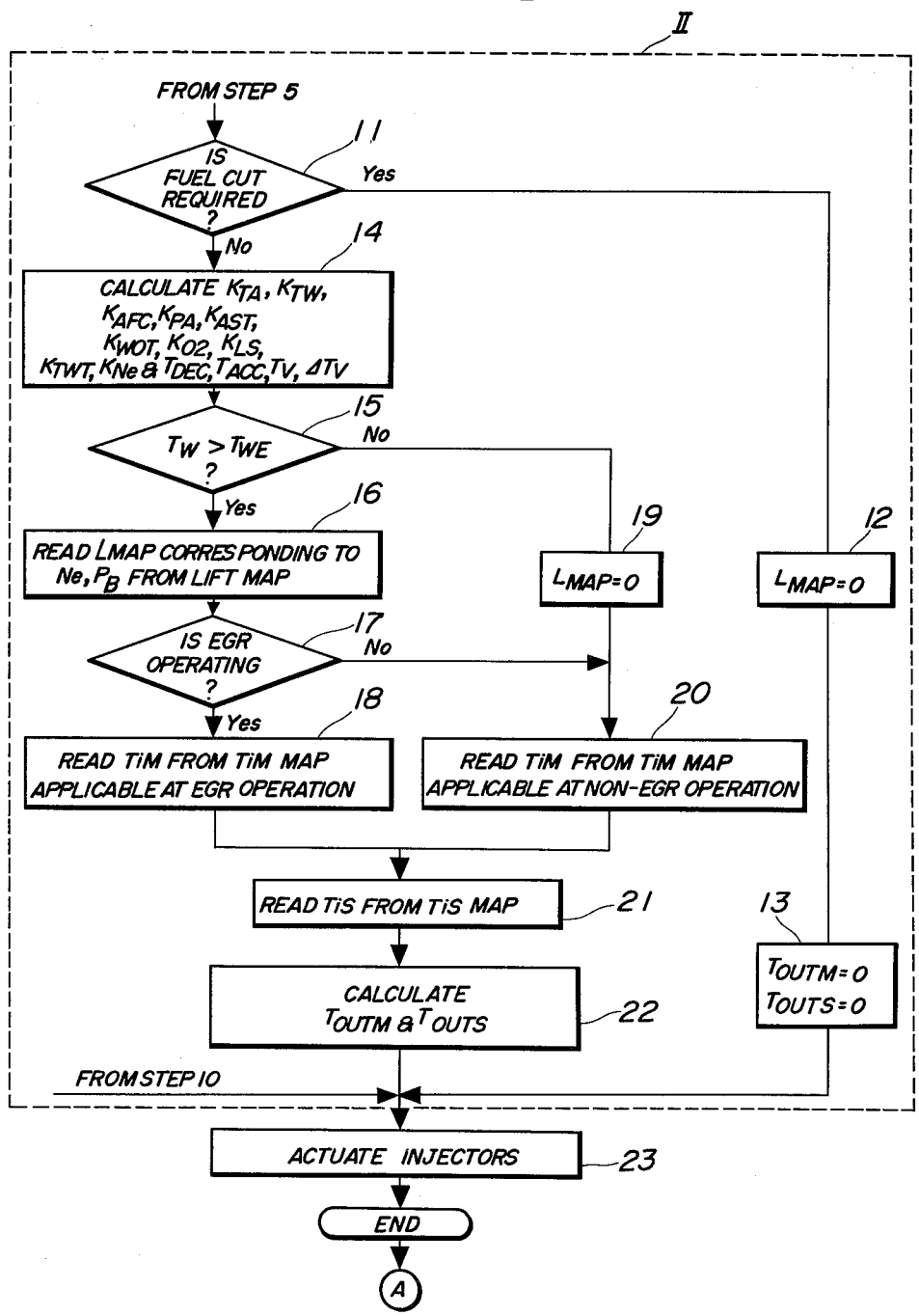

Referring next to FIG. 4, there is shown a flow chart of the aforementioned first program 1 for control of the valve opening period in synchronism with the TDC signal in the ECU 5. The whole program comprises an input signal processing block I, a basic control block II and a start control block III. First in the input processing block I, when the ignition switch of the engine is turned on, a CPU in the ECU 5 is initialized at the step 1 and the TDC signal is inputted to the ECU 5 as the engine starts at the step 2. Then, all basic analog values are inputted to the ECU 5, which include detected values of atmospheric pressue PA, absolute pressure PB, engine cooling water temperature TW, atmospheric air temperature TA, throttle valve opening $\theta$th, battery voltage V, output voltage value V of the $O_2$ sensor and on-off state of the starting switch 17, some necessary ones of which are then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (1), (2) to calculate the values of TOUTM and TOUTS (step 9).

During the start control subroutine III described above, a valve lift command value LMAP which indicates zero lift is selected at the step 10, to set the valve body lift of the exhaust gas recirculation valve 19 to zero. FIG. 5 shows a map of the lift command value LMAP, where ten steps of different predetermined values PB6-15 of the absolute pressure PB are provided which are set within a range of 204-780 mmHg for instance, and ten steps of different predetermined values N1-10 of the engine rpm Ne set within a range of 0-4000 rpm for instance. Lift command values LMAP are determined by means of interpolation, if actual values of the absolute pressure PB and/or the engine rpm Ne fall between the predetermined values or outside the range or ranges.

If the answer to the question of the above step 5 is no, it is determined whether or not the engine is in a condition for carrying out fuel cut, at the step 11. If the answer is yes, a lift command value LMAP is selected which indicates zero lift, at the step 12, and simultaneously the values of TOUTM and TOUTS are set to zero, at the step 13.

On the other hand, if the answer to the question of the step 11 is negative, calculations are carried out of values of correction coefficients KTA, KTW, KAFC, KPA, KAST, KWOT, KO₂, KLS, KTWT, etc. and values of correction constants TDEC, TACC, TV and $\Delta$TV, by means of the respective calculation subroutines and tables, at the step 14.

Then, a comparison is made of whether or not actual engine cooling water temperature TW is higher than a predetermined value TWE for carrying out the exhaust gas recirculating operation, at the step 15. If it is found that the former is higher than the latter, a lift command value LMAP is selected from the lift command value map, which corresponds to actual engine rpm Ne and actual intake pipe absolute pressure PB, at the step 16. Then, it is determined whether or not the exhaust gas recirculation valve 19 is operating, at the step 17. The engine operation where the valve 19 is operating will be referred to as "EGR operation" hereinafter, and that where it is at rest as "non-EGR operation", respectively. If the answer to the question of the step 17 is yes, a basic valve opening period value TiM is selected from a TiM map applicable during EGR operation, which corresponds to actual engine rpm Ne and actual absolute pressure PB, at the step 18. If the answer is negative at the step 17, another basic valve opening value TiM is selected from another map of the TiM value applicable during non-EGR operation, which corresponds to actual engine rpm Ne and actual absolute pressure PB, at the step 20.

On the other hand, if the determination at the step 15 gives a negative answer, a lift command value LMAP indicative of zero lift is selected at the step 19, while simultaneously a basic value TiM is selected from the non-EGR operation TiM map, which corresponds to actual engine rpm Ne and actual absolute pressure PB, at the step 20.

Following the above selection of the basic value TiM, a basic valve opening period value TiS is selected from a map of the TiS value, which corresponds to actual engine rpm Ne and actual absolute pressure PB, at the step 21.

Then, calculations are carried out of the values TOUTM, TOUTS on the basis of the values of correction coefficients and correction constants selected as described above, using the aforementioned equation (3), (4) (step 22). The main injectors and the subinjector are actuated with valve opening periods corresponding to the values of TOUTM, TOUTS obtained by the aforementioned steps 9, 13 and 22 (step 23).

As previously stated, in addition to the above-described control of the valve opening periods of the main injectors and the subinjector in synchronism with the TDC signal, asynchronous control of the valve opening periods of the main injectors is carried out in a manner asynchronous with the TDC signal but synchronous with a certain pulse signal having a constant pulse repetition period, detailed description of which is omitted here.

The manner of controlling the exhaust gas recirculation valve will now be described with reference to FIGS. 6 through 8. As previously stated, the lift command value LMAP for the lift L of the exhaust gas recirculation valve in FIG. 1 is determined by the use of the map of FIG. 5, as a function of engine rpm Ne and intake pipe absolute pressure PB, at the step 16 in FIG. 4. On the other hand, the actual lift LACT of the exhaust gas recirculation valve 19 is detected by the lift sensor 24 provided on the same valve, and an output signal indicative of the detected lift LACT is inputted to the ECU 5, for determination of the difference l (=LACT−LMAP) between the actual lift LACT and the determined lift command value LMAP. The pressure in the negative pressure chamber 19d of the exhaust gas recirculation valve 19 is controlled by actuating one or both of the EGR control valve 21 communicating with the atmosphere, hereinafter called "SOL. A", and the EGR control valve 22 communicating with the interior of the intake pipe 2, hereinafter called "SOL. B", depending upon the absolute value of the above difference 1 and upon whether or not the difference 1 is larger than 0, to thereby control the actual valve opening or lift of the exhaust gas recirculation valve 19 so as to make it equal to the lift command value LMAP or make the difference 1 zero.

Figure 6:
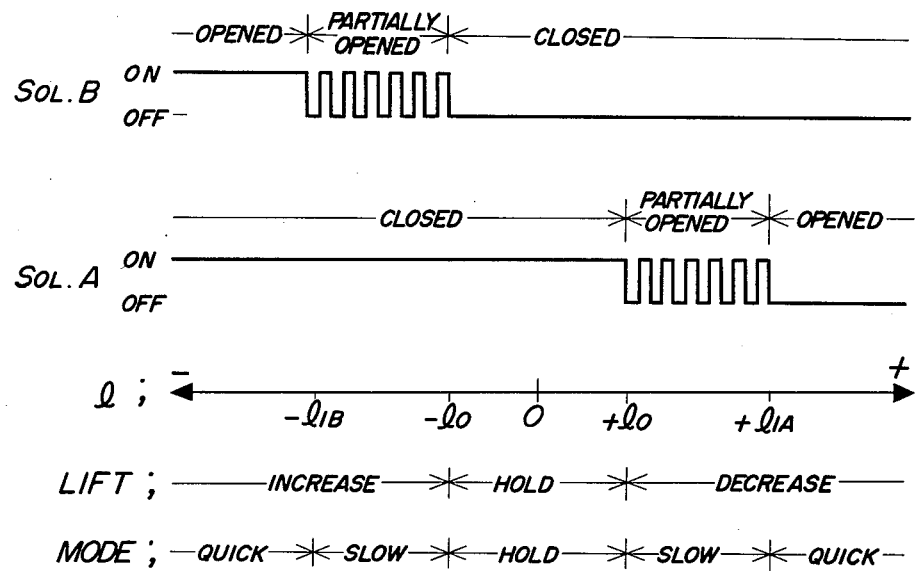
FIG. 6 is a timing chart showing the relationship between the difference between an actual valve opening or lift value and a valve lift command value, on-off actions of solenoid valves, and a lifting action of the exhaust gas recirculation valve.
Figure 7:
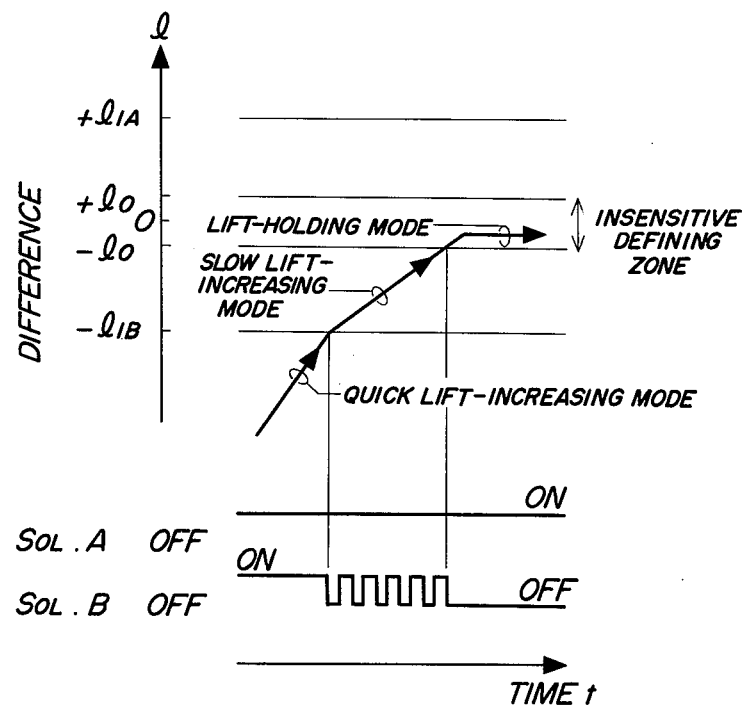
FIG. 7 is a graph showing the relationship between the difference between an actual valve lift value and a valve lift command value, and the valve opening correcting speed, applicable when the exhaust gas recirculation valve is on the valve opening stroke.

FIG. 6 shows the manner of controlling the exhaust gas recirculation valve which is carried in response to the absolute value of the difference 1 and also to whether or not the same difference 1 is larger than 0. If the absolute value of the difference 1 is larger, than a predetermined value $l_1$, the valve lift correcting action of the exhaust gas recirculation valve is effected in a quick manner, while if the absolute value of the difference 1 is, equal to or smaller than the above predetermined value $l_1$, the valve lift correcting action is effected in a slow manner. Further, if the same absolute value becomes equal to or smaller than other smaller predetermined value $l_0$, which is an insentive zone defining value, it is regarded that the actual valve lift has reached the target or lift command value, and then the valve lift correcting action is interrupted to hold the actual lift at its present position. More specifically, as shown in FIG. 7, assuming that the lift command value LMAP is larger than 0 and the difference 1 is smaller than 0, with its absolute value larger than the predetermined value $l_1(=l_1B)$, that is, $1 < -l_1B$, SOL. A and SOL. B are both continuously energized with a 100 percent pulse duty factor, to open the passageway 20 communicating the negative pressure chamber 19d with the intake pipe 2, while simultaneously closing the passageway 23 communicating with the atmosphere, so that negative pressure then prevails in the negative pressure chamber 19d, thus causing the valve body of the exhaust gas recirculation valve to be lifted at a higher speed in a prompt manner. When the valve opening of the exhaust gas recirculation valve increases toward the target value so that the difference 1 is brought into a relationship of $-l_1B \leq 1 < -l_0$, SOL. B is now energized with a partial pulse duty factor, that is, intermittently opened to cause the valve body of the exhaust gas recirculation valve to be lifted at a lower speed in a slow manner, in order to prevent that the actual valve opening overshoots its target value. That is, while SOL. A is still continuously energized with a 100 percent pulse duty factor, SOL. B is intermittently energized with a predetermined pulse duration to effect lifting of the exhaust gas recirculation valve in slow mode. When the exhaust gas recirculation valve is further lifted so that the actual valve opening falls within a tolerable insensitive zone $\pm l_0$ in the vicinity of the target value, that is, it is brought into a relationship of $-l_0 \leq 1 \leq +l_0$, the valve lift correcting action is interrupted by continuously energizing SOL. A and keeping SOL. B deenergized, respectively.

Figure 8:
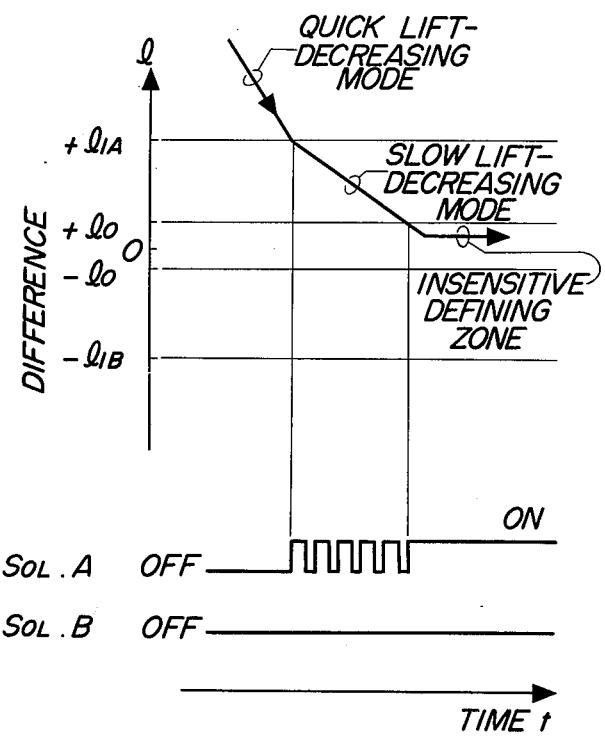
FIG. 8 is a graph similar to FIG. 7, applicable when the exhaust gas recirculation valve is on the valve closing stroke.

When the lift command value LMAP is larger than 0 and the difference 1 is larger than 0 with its absolute value larger than the predetermined value $l_1(=l_1A)$, as shown in FIG. 8, SOL. A and SOL. B are both continuously deenergized to cause the negative pressure chamber 19d to communicate with the atmosphere for an rapid decrease in the lift of the exhaust gas recirculation valve 19. When the difference 1 is brought into a relationship of $l_0 < 1 < +l_1A$, SOL. A is intermittently energized with a partial pulse duty factor to cause a further decrease in the lift of the valve 19 in a slow manner, while simultaneously the deenergization of SOL. B is continued so as to prevent overshooting of the actual lift with respect to the target value. When the valve lift is further decreased so that the valve opening falls within the insensitive zone $\pm l_0$, the valve lift correcting action is interrupted by continuously energizing SOL. A and keeping SOL. B deenergized, respectively.

Figure 9:
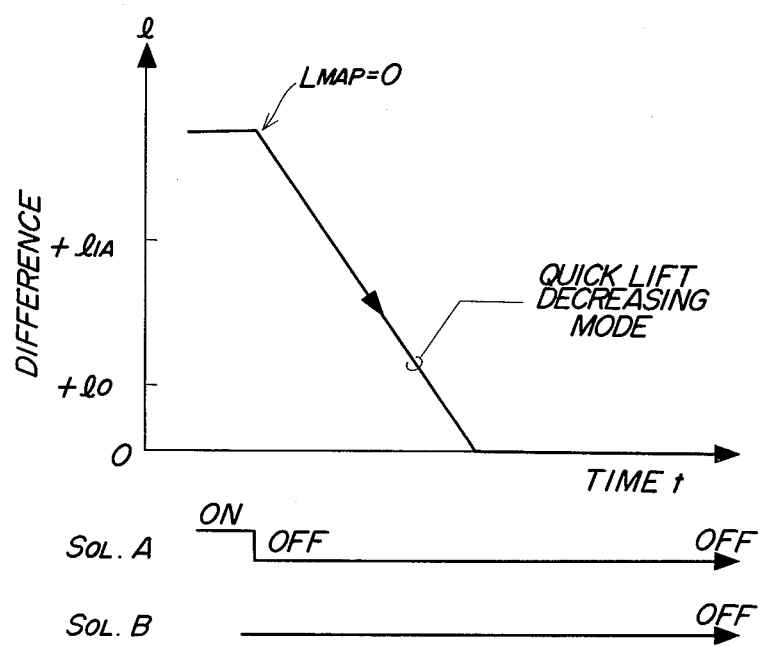
FIG. 9 is a graph showing a valve closing action of the exhaust gas recirculation valve applicable when the valve lift command value LMAP is zero.

When a lift command value LMAP indicating zero lift is read from the map of FIG. 5, there is no possibility of occurrence of overshooting and hunting of the valve body 19a of the exhaust gas recirculation valve 19 even if the valve lift decreasing action is effected in a rapid manner until the actual valve opening becomes zero, because the valve body 19a of the exhaust gas recirculation valve 19 is merely displaced to its full closing position in a rapid manner to positively keep the exhaust gas recirculation passageway 18 closed with its valve spring 19c urging the valve body 19a against its valve seat. FIG. 9 shows the relationship between the change of the difference 1 and the energization of SOL. A and SOL. B in the event of the lift command value being zero. In this event, SOL. A and SOL. B are both kept deenergized to effect the valve lift decreasing action at a higher speed.

Figure 10B:
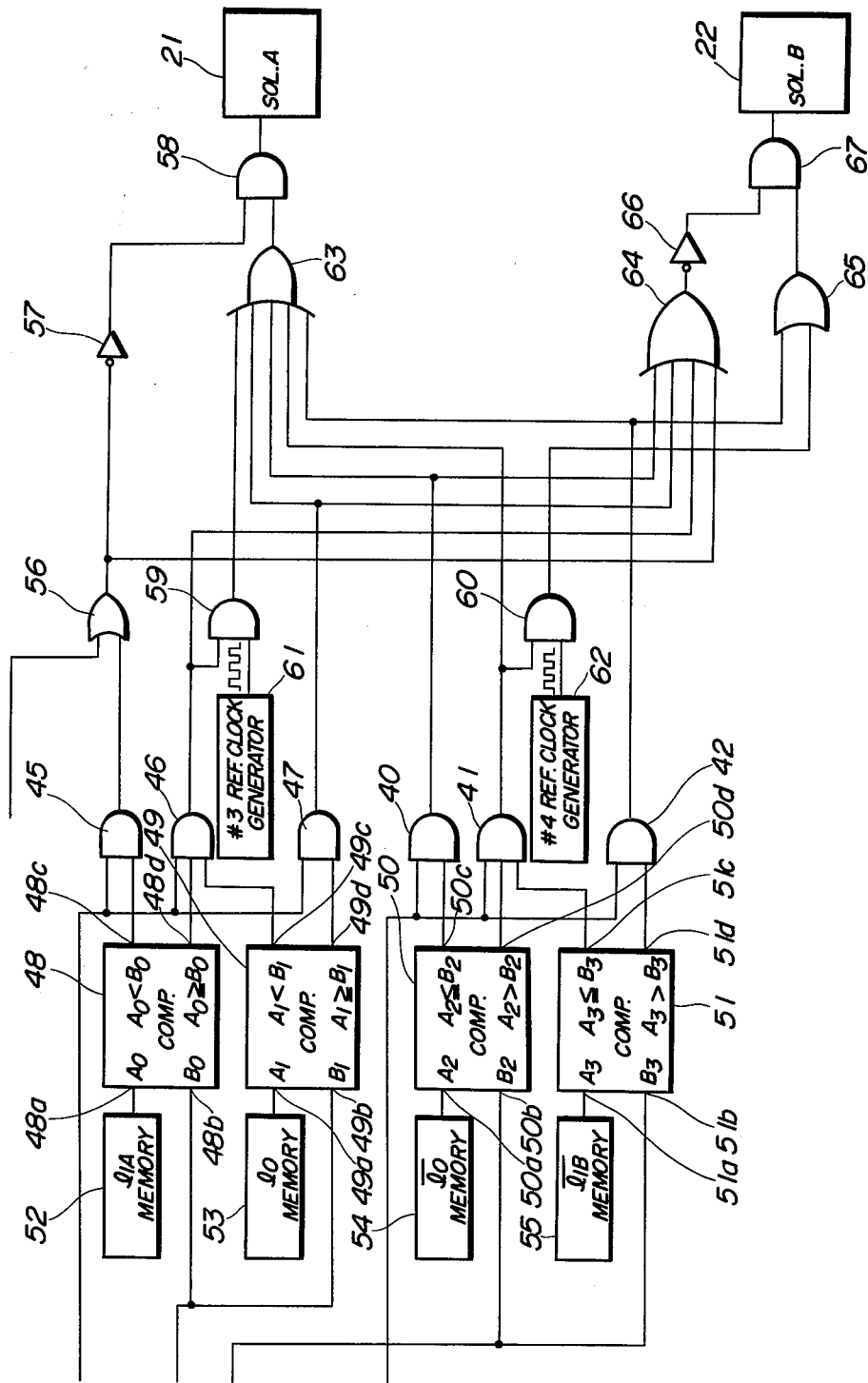

FIG. 10 illustrates a valve opening control circuit provided in the ECU 5 for carrying out the above described control of the exhaust gas recirculation valve 19, according to an embodiment of the present invention. The engine rpm sensor 11 in FIG. 1 is connected to a sequential clock generator 26 by way of a one shot circuit 25. The sequential clock generator 26 has a first output terminal 26a connected to an NE value register 29, and a second output terminal 26b to an NE value counter 28 and an address register 30, respectively. A first reference clock generator 27 is connected to both the input of the sequential clock generator 26 and the input of the Ne value counter 28. The Ne value counter 28, the NE value register 29, and the address register 30 are serially connected in the order mentioned. The address register 30 has its output connected to the input of a valve opening command value memory 31. The intake pipe absolute pressure PB sensor 8 in FIG. 1 is connected to the input of a PB value register 33 by way of a first A/D converter 32, which register in turn has its output connected to the input of the above-mentioned address register 30. The valve opening command value memory 31 has its output connected to a comparator 34 at its one input terminal 34a as well as a subtracter 35 at its one input terminal 35a. The EGR lift sensor 24 in FIG. 1 is connected to the input of a valve opening value register 37 by way of a second A/D converter 36, which register in turn has its output connected to the above-mentioned subtracter 35 at its other input terminal 35b. A second reference clock generator 38 is connected to the second A/D converter 36 and the valve opening value register 37, to supply a starting command signal and a data set signal to them. The subtracter 35 has its one output terminal 35c connected to AND circuits 39–42 at their one input terminals directly, as well as AND circuits 44–47 at their one input terminals by way of an inverter 43, respectively. The subtracter 35 has another output terminal 35d connected to the AND circuits 39 and 44 at their other input terminals directly. The AND circuit 44 has its output connected to comparators 48 and 49 at their one input terminals 48b and 49b, while the AND circuit 39 has its output connected to comparators 50 and 51 at their one input terminals 50b and 51b. The comparators 48-51 have their other input terminals 48a-51a connected, respectively, to an $l_1A$ value memory 52, an $\overline{l_0}$ value memory 53, an $l_0$ value memory 54, and an $\overline{l_1B}$ value memory 55. The AND circuit 45 has its other input terminal connected to the comparator 48 at its one output terminal 48c, and the AND circuit 46 has its second and third input terminals connected, respectively, to the comparator 48 at its other output terminal 48d and the comparator 49 at its one output terminal 49c. Further, the AND circuit 47 has its other input terminal connected to the comparator 49 at its other output terminal 49d. The AND circuit 40 has its other input terminal connected to the comparator 50 at its one output terminal 50c, and the AND circuit 41 has its second and third input terminals connected, respectively, to the comparator 50 at its other output terminal 50d, and also to the comparator 51 at its one output terminal 51c. The AND circuit 42 has its other input terminal connected to the comparator 51 at its other output terminal 51d. The AND circuit 45 has its output connected to an OR circuit 56 at its one input terminal, which in turn has its output connected to an AND circuit 58 at its one input terminal by way of an inverter 57, and also to the input of an OR circuit 64, directly. The AND circuit 46 has its output connected to the inputs of the OR circuit 64 and an AND circuit 59. The AND circuit 47 has its output connected to the inputs of an OR circuit 63 and the OR circuit 64. A third reference clock generator 61 has its output connected to the input of the OR circuit 63 by way of the aforementioned AND circuit 59. The AND circuit 40 has its output connected to the inputs of the OR circuit 63 and the OR circuit 64, the AND circuit 41 has its output connected to the inputs of the OR circuit 63 and an AND circuit 60, and the AND circuit 42 has its output connected to the inputs of the OR circuit 63 and the OR circuit 65. A fourth clock generator 62 has its output connected to the input of the OR circuit 65 by way of the aforementioned AND circuit 60. The OR circuit 63 has its output connected to the AND circuit 58 at its other input terminal, while the OR circuit 64 has its output connected to an AND circuit 67 at its one input terminal by way of an inverter 66. The OR circuit 65 has its output connected to the AND circuit 67 at its other input terminal. The AND circuit 58 has its output connected to the selenoid of the EGR control valve 21 (SOL. A) in FIG. 1, and the AND circuit 67 has its output connected to the solenoid of the EGR control valve 22 (SOL. B). The comparator 34 has its output terminal 34c connected to the input of the OR circuit 56.

The operation of the exhaust gas recirculation valve control circuit arranged above is as follows: A TDC signal generated by the engine rpm sensor 11 is supplied to the one shot circuit 25 which forms a waveform shaping circuit in cooperation with the sequential clock generator 26 arranged adjacent thereto. The one shot circuit 25 generates an output pulse SO upon application of each TDC pulse thereto, and applies it to the sequential clock generator 26. The generator 26 sequentially generates clock pulses CP0 and CP1 upon application of the pulse S0 thereto, which pulses have a predetermined pulse repetition period corresponding to clock pulses generated by the first reference clock generator 27. The pulse CP0 is supplied to the NE value register 29, and the pulse CP1 to the Ne value counter 28 and the address register 30, respectively. The clock pulse CP0 is applied to the NE value register 29 to cause same to store a count outputted from the Ne value counter 28 which permanently counts reference clock pulses generated by the reference clock generator 27. Then, the clock pulse CP1 is applied to the Ne value counter 28 to reset the count in the counter 28 to zero. Since the interval of generation of the pulse CP1 is shorter as the engine rpm increases, the value stored in the NE value register 29 is proportionate to the reciprocal of the engine rpm Ne. The PB value register 33 stores value of the intake pipe absolute pressure PB detected by the PB sensor 8 and converted into a corresponding digital amount by the first A/D converter 32. Upon application of the clock pulse CP1 to the address register 30, the NE value stored in the NE value register 29 and the PB value stored in the PB value register 33 are newly loaded into the same register 30 to cause it to selectively read an address value coresponding to the loaded engine rpm NE and absolute pressure PB, and apply same to the valve opening command value memory 31. The memory 31 in turn selectively reads out a lift command value LMAP corresponding to the intput address value from its stored map corresponding to the map shown in FIG. 5. The lift command value LMAP thus read is applied to the input terminal 34a of the comparator 34 as an input A4 and also to the input terminal 35a of the subtracter 35 as an input Y, respectively. The comparator 34 has its other input terminal 34b grounded, that is, its input signal B4 permanently has a value of 0. Since the relationship of A4=B4 does not stand when the lift command value LMAP is larger than 0, the comparator 34 generates an output of 0 through its output terminal 34c, which is inverted into a high level of 1 by the inverters 57 and 66 are applied to the AND circuits 58 and 67 at their one input terminals. If on this occasion the AND circuits 58 and 67 are supplied with inputs of 1 at their other input terminals, SOL. A and SOL. B both have their solenoids energized to open. When the lift command value LMAP is 0, the input relationship of A4=B4 stands at the comparator 34, and accordingly, an output of 1 is generated from the comparator 34, so that the AND circuits 58 and 67 have their one input terminals supplied with low level inputs of 0 which have been inverted by the inverters 57 and 66. Therefore, irrespective of the levels of inputs to the other input terminals of the AND circuits 58 and 66, SOL. A and SOL. B are deenergized to close so that the exhaust gas recirculation valve has its lift rapidly reduced to zero in rapid mode, as shown in FIG. 9.

An output signal of the lift sensor 24 mounted on the exhaust gas recirculation valve 19, which is indicative of the actual valve lift of the latter, is supplied to the second A/D converter 36 which in turn converts the above analog signal into a corresponding digital signal each time a starting command pulse is applied thereto by the second refernce clock generator 38, and the digital signal is supplied to the valve opening value register 37. In the valve opening value register 37, the stored value is replaced by a new one each time a data set pulse is applied to the register 37 by the second reference clock generator 38, and the renewed stored value is applied to the input terminal 35b of the subtracter 35 as an input X.

At the subtracter 35, the value of the input Y indicative of a lift command value LMAP which has been read as previously stated, is subtracted from the value of the input X indicative of the actual valve lift, to obtain a difference $l$ (=X−Y). When the difference $l$ is smaller than 0, the subtracter 35 generates an output of 1 through its output terminal 35c, and when the difference $l$ is larger than or equal to 0, it generates an output of 0. Also, the subtracter 35 always generates an output indicative of the value of the difference $l$ through its other input terminal 35d.

Let it now be assumed that the actual valve lift is too small as compared with a lift command value LMAP, selectively read out. Referring to FIG. 6, when the lift command value LMAP had just been selected and the difference $l$ is smaller than $-l_1B$, a relationship of $X-Y<-l_1B$ stands at the subtracter 35, and accordingly an output of 1 is generated through the output terminal 35c and supplied to the AND circuits 39 through 42. This output of 1 is also supplied as a low level input of 0 to the AND circuits 44 through 47 by way of the inverter 43 to close them. The AND circuit 39, which is opened by the above output of 1, allows the value of X−Y supplied from the subtracter 35 through the output terminal 35d to be applied to the input terminal 50b of the comparator 50 as an input B2, and to the input terminal 51b of the comparator 51 as in input B3, respectively. When the value of X−Y is smaller than 0, the same value is supplied to the comparators 50 and 51 in the form of the two's complement of the absolute value $|X-Y|$. The $\overline{l_0}$ value memory 54 stores the two's complement of the predetermined value $l_0$, which is applied to the input terminal 50a of the comparator 50 as an input A2. The $\overline{l_1B}$ value memory 55 stores the two's complement of the predetermined value $l_1B$, which is applied to the input terminal 51a of the comparator 51 as an input A3. Since it has been assumed that the value of X−Y is smaller than $-l_1B$, an input relationship of A2>B2 stands at the comparator 50 so that an output of 1 is generated through the output terminal 50d of the comparator 50 and applied to the AND circuit 41, while an input relationship of A3>B3 stands at the comparator 51 so that an output of 1 is generated through the output terminal 51d of the comparator 51 and applied to the AND circuit 42. At the same time, the comparators 50 and 51 generate outputs of 0 through their other output terminals 50c and 51c to keep the AND circuits 40 and 41 closed. Therefore, only the AND circuit 42 has its both input terminals supplied with inputs of 1, and accordingly generates an output of 1 and supplies it to the AND circuits 58 and 67 through the OR circuits 63 and 65. Consequently, the OR circuit 64 has all of its input terminals supplied with inputs of 0, and the resultant output of 0 is inverted into a high level of 1 by the inverter 66, and applied to the AND circuit 67. On the other hand, since the input relationship of A4=B4 (LMAP=0) does not stand at the comparator 34 on this occasion, an output of 0 is generated through its output terminal 34c, then inverted into a high level of 1 by the inverter 57, and applied to the AND circuit 58. Therefore, both of SOL. A and SOL. B are energized to drive the exhaust gas recirculation valve 19 to rapidly increase its lift in rapid mode, as shown in FIGS. 6 and 7.

Then, when the valve lift of the exhaust gas recirculation valve is increased so that a relationship of $-l_1B \leq l < -l_0$ stands, and accordingly, a relationship of X−Y<0 stands at the subtracter 35, the subtracter 35 applies an output of 1 to the AND circuits 39 through 42, whereas the AND circuits 44 through 47 are supplied with inputs of 0 by way of the inverter 43, in a similar manner to that previously stated. Then, the comparator 50 has an input relationship of A2>B2 (A2=$-l_0$, B2=X−Y=$l$), and accordingly applies an output of 0 to the AND circuit 40 through its output terminal 50c and an output of 1 to the AND circuit 41 through its output terminal 50d, respectively. At the same time, the comparator 51 has an input relationship of A3≦B3 (A3=$-l_1B$, B3=X−Y=$l$), and accordingly applies an output of 1 to the AND circuit 41 through its output terminal 51c, and an output of 0 to the AND circuit 42 through its output terminal 51d, respectively. Therefore, the AND circuits 40 and 42, which thus have their one input terminals supplied with inputs of 0, are closed, whereas the AND circuit 41, which has all of its input terminals supplied with inputs of 1, generates and applies an output of 1 to the AND circuit 58 through the OR circuit 63, and also to the AND circuit 60 directly. The AND circuit 60 is also supplied with clock pulses having a predetermined small pulse separation and a predetermined pulse width from the fourth reference clock generator 62. The clock pulses are supplied through the AND circuit 65 to the AND circuit 67. On the other hand, the OR circuit 64 has all of its input terminals supplied with inputs of 0, and its resultant output of 0 is inverted into a high level of 1 by the inverter 66 and applied to the AND circuit 67. Since the input relationship of A4=B4 (LMAP=0) does not stand at the comparator 34 on this occasion, the resultant output of 0 is inverted into a high level of 1 by the inverter 57, and applied to the AND circuit 58. Therefore, while SOL. A is continuously energized with a 100 percent pulse duty factor, SOL. B is intermittently energized with a pulse duty factor corresponding to the clock pulses outputted from the fourth reference clock generator 62. Thus, the exhaust gas recirculation valve 19 has its lift slowly increased in slow mode, as shown in FIGS. 6 and 7.

When there occurs a further increase in the valve lift of the exhaust gas recirculation valve 19 so that a relationship of $-l_0 \leq l < 0$ stands, and accordingly the subtracter 35 has a relationship of $-l_0 \leq X-Y < 0$, the AND circuits 39 through 42 are opened, whereas the AND circuits 44 through 47 are closed, as previously mentioned. Then, the comparator 50 has an input relationship of A2≦B2 to apply an output of 1 to the AND circuit 40 through its output terminal 50c, and an output of 0 to the AND circuit 41 through its output terminal 50d, respectively. At the same time, the comparator 51 has an input relationship of A3≦B3 to apply an output of 1 to the AND circuit 41 through its output terminal 51c, and an output of 0 to the AND circuit 42 through its output terminal 51d, respectively. Thus, the AND circuits 41 and 42, which have their one input terminals supplied with low level inputs of 0, are then closed, whereas the AND circuit 40, which has its input terminals all supplied with high level inputs of 1, are opened. Therefore, the AND circuit 58 is supplied with a high level input of 1 through the OR circuit 63, and the AND circuit 67 with a low level input of 0 through the OR circuit 64 and the inverter 66, respectively. Since on this occasion the comparator 34 does not have the input relationship of A4=B4 (LMAP=0), it generates an output of 0 through its output terminal 34c, and the resultant output of 0 is inverted by the inverter 57, and applied to the AND circuit 58. Thus, SOL. A is continuously energized, whereas SOL. B is kept in a deenergized state. That is, on this occasion, the valve lift of the exhaust gas recirculation valve falls within the tolerable range $\pm l_0$ with respect to the target lift command value LMAP, and therefore, the valve lift correcting action is interrupted to hold the valve body of the exhaust gas recirculation valve at its present position.

On the other hand, in the event that the actual valve lift is too large for a lift command value LMAP selected, that is, a relationship of $X-Y>l_1A$ stands, the subtracter 35 generates an output of 0 through its output terminal 35c to cause the AND circuits 44 through 47 to be opened, and the AND circuits 39 through 42 to be closed, and comparisons are made between the difference $l (=X-Y)$ and the predetermined values $l_1A$ and $l_0$, stored in the memories 52 and 53, at the comparators 48 and 49, to control SOL. A and SOL. B depending upon the difference l, in a manner substantially similar to that above described with respect to the case where the valve lift is too small.

What is claimed is:

1. An exhaust gas recirculation control system for use in an internal combustion engine having an intake pipe and an exhaust pipe, comprising: an exhaust gas recirculating passageway connecting said exhaust pipe to said intake pipe; an exhaust gas recirculation valve having a controllable valve opening and arranged across said exhaust gas recirculating passageway for opening and closing same; command means responsive to operating conditions of said engine for generating a command signal indicative of a required valve opening value for said exhaust gas recirculation valve; sensor means for detecting an actual value of the valve opening of said exhaust gas recirculation valve and generating a signal indicative of said actual value; actuator means connected to said exhaust gas recirculation valve for varying the valve opening thereof; and control means responsive to the difference between an actual valve opening value indicated by said actual value signal and a required valve opening value indicated by said command signal for controlling said actuator means so as to minimize said difference, said control means being operable to control said actuator means to vary the valve opening of said exhaust gas recirculation valve at a plurality of difference speeds in a manner such that a higher speed is selected when said difference has a larger absolute value, and a lower speed is selected when said difference has a smaller absolute value.

2. The exhaust gas recirculation control system as claimed in claim 1, wherein said control means is adapted to cause the valve opening of said exhaust gas recirculation valve to be varied at a first speed having a higher value when said difference between an actual valve opening value indicated by said actual value signal and a required valve opening value indicated by said command signal has an absolute value larger than a predetermined value, and to cause said valve opening to be varied at a second speed having a value lower than said first speed when said difference has an absolute value equal to or smaller than said predetermined value.

3. The exhaust gas recirculation control system as claimed in claim 2, wherein said control means is adapted to cause the valve opening of said exhaust gas recirculation valve to be varied at said first speed, irrespective of the absolute value of said difference, when said command signal generated by said command means is indicative of full closing of said exhaust gas recirculation valve.

4. The exhaust gas recirculation control system as claimed in any one of claims 1, 2 or 3, wherein said command means includes memory means storing a plurality of predetermined command values which are functions of operating conditions of said engine, and means responsive to operating conditions of said engine for selectively reading said predetermined command values from said memory means.

5. The exhaust gas recirculation control system as claimed in claim 1, wherein said exhaust gas recirculation valve comprises a valve body disposed for opening and closing said exhaust gas recirculating passageway, a pressure-actuated member coupled to said valve body, and a negative pressure chamber defined by said pressure-actuated member, said pressure-actuated member being displaceable in response to negative pressure in said negative pressure chamber to increase the valve opening of said exhaust gas recirculation valve with an increase in said negative pressure.

6. The exhaust gas recirculation control system as claimed in claim 5, wherein said actuator means comprises a negative pressure passageway communicating said negative pressure chamber with said intake pipe of said engine, an atmospheric pressure passageway communicating said negative pressure chamber with the atmosphere, a first solenoid valve arranged across said negative pressure passageway for opening and closing same, and a second solenoid valve arranged across said atmospheric pressure passageway for opening and closing same.

7. The exhaust gas recirculation control system as claimed in claim 6, wherein said control means comprises first determining means for determining in terms of an absolute value said difference between an actual valve opening value indicated by said actual value signal and a required valve opening value indicated by said command signal, and also determining whether or not said difference is larger than 0, second determining means for determining whether or not the absolute value of said difference determined by said first determining means is larger than a predetermined value, and driving means responsive to a first signal generated by said first determining means and indicative of whether or not said difference is larger than 0, for driving said first and second solenoid valves in a selective manner depending upon said first signal, and also responsive to a second signal generated by said second determining means and indicative of the absolute value of said difference is larger than said predetermined value, for driving said first and second solenoid valves at said predetermined speeds having been selected depending upon said second signal.

8. The exhaust gas recirculation valve as claimed in claim 7, wherein said first solenoid valve comprises a normally closed type which is disposed to close said negative pressure passageway when deenergized, and said second solenoid valve comprises a normally opened type which is disposed to open said atmospheric pressure passageway when deenergized.

9. The exhaust gas recirculation valve as claimed in claim 8, wherein said difference between an actual valve opening value indicated by said actual value signal and a required valve opening value indicated by said command signal is obtained by subtracting the latter value from the former value, and said driving means operates (i) to continuously deenergize both of said first and second solenoid valves when said difference is larger than 0 and has an absolute value larger than predetermined value, (ii) to continuously deenergize said first solenoid valve and intermittently energize said second solenoid valve with a predetermined pulse duty factor when said difference is larger than 0 and has an absolute value equal to or smaller than said predetermined value, (iii) to continuously energize both of said first and second solenoid valves with a 100 percent pulse duty factor when said difference is smaller than 0 and has an absolute pressure larger than said predetermined value, and (iv) to intermittently energize said first solenoid valve with a predetermined pulse duty factor and continuously energize said second solenoid valve with a 100 percent pulse duty factor when said difference is smaller than 0 and has an absolute value equal to or smaller than said predetermined value.

10. The exhaust gas recirculation control system as claimed in claim 8 or claim 9, wherein said driving means operates to continuously deenergize said first solenoid valve and continuously energize said second solenoid valve with a 100 percent pulse duty factor, irrespective of whether or not said difference is larger than 0, when said difference has an absolute value equal to or smaller than a second predetermined value smaller than said predetermined value.

11. The exhaust gas recirculation control system as claimed in claim 8 or claim 9, wherein said driving means operates to continuously deenergize both of said first and second solenoid valves when said command signal generated by said command means is indicative of full closing of said exhaust gas recirculation valve.

* * * * *